US 7,392,824 B2

(12) United States Patent
Bogdanowicz et al.

(10) Patent No.: US 7,392,824 B2
(45) Date of Patent: Jul. 1, 2008

(54) FLUID POWER DEVICE WITH A PRESSURE REGULATOR

(75) Inventors: Grzegorz Bogdanowicz, Ostfildern (DE); Andreas Decker, Korntal (DE)

(73) Assignee: Festo AG & Co., Esslingen (DE)

( * ) Notice: Subject to any disclaimer, the term of this patent is extended or adjusted under 35 U.S.C. 154(b) by 406 days.

(21) Appl. No.: 11/220,801

(22) Filed: Sep. 7, 2005

(65) Prior Publication Data

US 2006/0060249 A1 Mar. 23, 2006

(30) Foreign Application Priority Data

Sep. 20, 2004 (DE) ............... 10 2004 046 547

(51) Int. Cl.
*F16K 37/00* (2006.01)
*G01L 7/00* (2006.01)
(52) U.S. Cl. ............... 137/557; 137/102; 137/505.11; 73/756
(58) Field of Classification Search ............... 137/102, 137/505.11, 557, 884; 73/756; 76/756
See application file for complete search history.

(56) References Cited

U.S. PATENT DOCUMENTS

| 1,797,591 | A | * | 3/1931 | Sartakoff | 137/557 |
| 2,115,512 | A | * | 4/1938 | Vincent | 137/557 |
| 2,739,611 | A | * | 3/1956 | Cornelius | 137/557 |
| 4,598,581 | A | * | 7/1986 | Brekke | 73/756 |
| 4,687,021 | A | * | 8/1987 | Ise et al. | 137/557 |
| 4,823,835 | A | | 4/1989 | Chu | |
| 4,827,983 | A | * | 5/1989 | Hoffmann | 137/557 |
| 5,598,869 | A | * | 2/1997 | Nelson | 137/557 |
| 5,713,609 | A | | 2/1998 | Mascola | |
| 6,237,624 | B1 | * | 5/2001 | Neumair | 137/557 |
| 6,675,830 | B2 | * | 1/2004 | Doi et al. | 137/557 |
| 7,007,713 | B2 | * | 3/2006 | Wada et al. | 137/557 |
| 2005/0211309 | A1 | * | 9/2005 | Igarashi | 137/557 |

FOREIGN PATENT DOCUMENTS

| DE | 34 16 109 A1 | 10/1985 |
| DE | 102 59 395 | 7/2004 |

OTHER PUBLICATIONS

Festo AG Product Catalog entitled Pneumatic Katalog Ventile; Serie 2005/2012, pp. V-77 to V-79.

* cited by examiner

*Primary Examiner*—John Rivell
(74) *Attorney, Agent, or Firm*—Hoffmann & Baron, LLP

(57) ABSTRACT

A fluid power device having at least one pressure regulator whose regulator housing is fitted at the end side with a manometer. In order to ensure readability of its display face when looking at it from different angles the manometer is able to be positioned at different alignments in relation to the regulator housing. For this purpose the manometer is mounted on a holder, which is able to be pivoted in relation to regulator housing about an axis of rotation perpendicular to the longitudinal axis and to the upright axis of the pressure regulator to present different display positions.

18 Claims, 4 Drawing Sheets

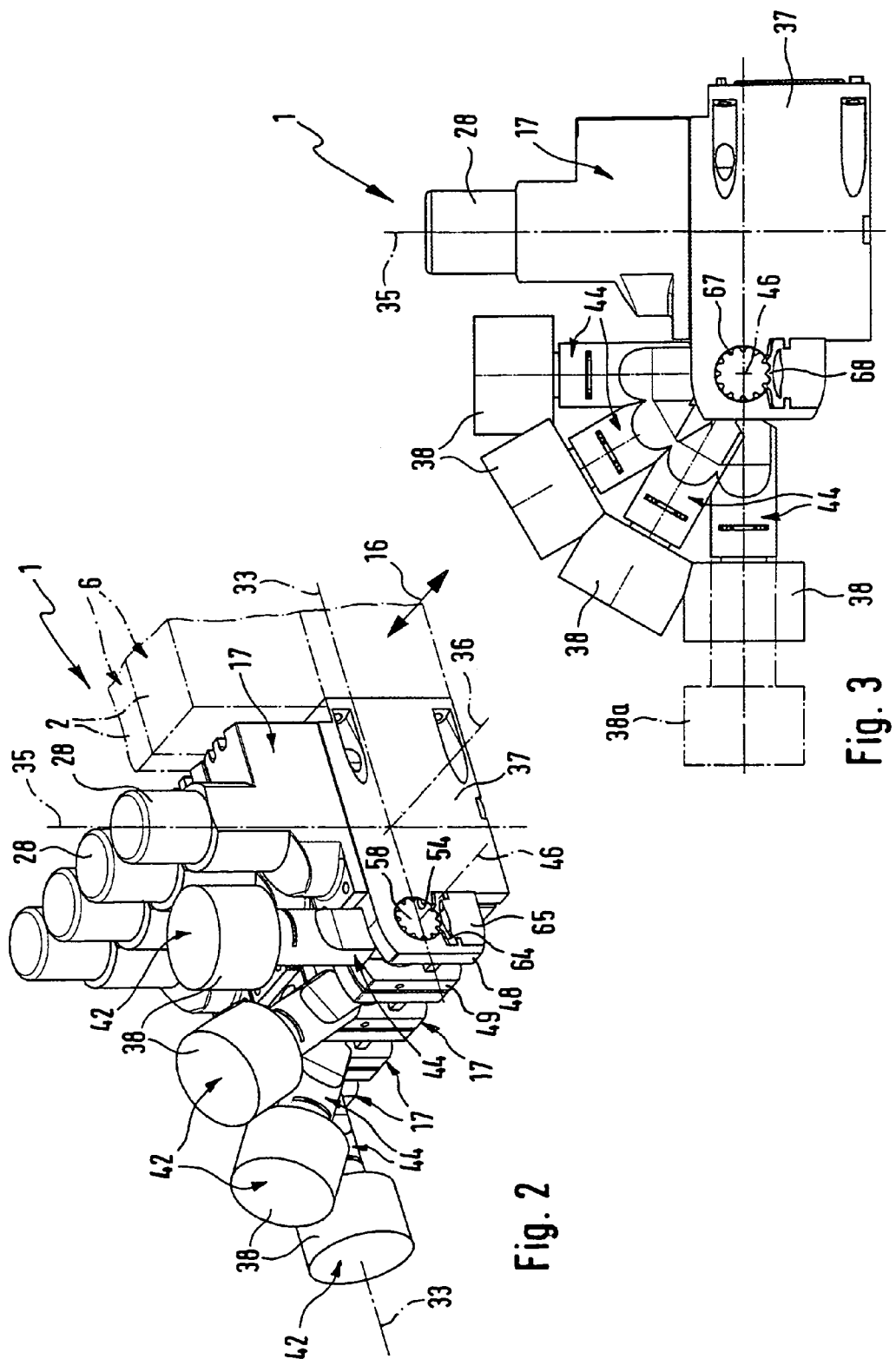

FLUID POWER DEVICE WITH A PRESSURE REGULATOR

BACKGROUND OF THE INVENTION

The invention relates to a fluid power device fitted with at least one pressure regulator having a longitudinal axis and an upright axis perpendicular thereto, the housing of said pressure regulator being fitted with a manometer at an end thereof, said manometer indicating the secondary pressure tapped via a tapping duct from the regulator housing and being able to be positioned with different alignments in relation to the regulator housing in order to ensure readability of its display face from different directions of viewing.

THE PRIOR ART

A fluid power device of this type is listed in the brochure entitled "Pneumatik-Katalog-D-11/02; Ventile; Serie 2005/2012" pages V-77 through V-79 of the company Numatics. It is here a question of a valve device in which a base plate is fitted with a plurality of multi-way valves arranged in a line-up direction side by side, some multi-way valves being seated on an intermediate plate, on which at one or both end sides a pressure regulator is mounted, with which the pressure of compressed air flowing to or from the multiway valve may be reduced to a desired secondary pressure. The set secondary pressure may be read off using a manometer arranged on the respective regulator housing at the end. In order to take into account different fitted positions of the fluid power device the manometer may alternatively be installed in two different directions or alignments, its display face facing either in the direction of the longitudinal axis of the or in the direction of the upright axis of the pressure regulator. In one alignment the manometer is directly installed on the regulator housing. For another alignment an elbow connecting member with an angle of 90 degrees is fitted between the manometer and the regulator housing. Such adaptation measures are comparatively slow to perform and may furthermore only be undertaken in the inactivated state of the fluid power device.

The U.S. Pat. No. 4,823,835 discloses a pivotal connector having a base with a fluid outlet and bearing a valve, said connector having a pivotal part mounted on the base for pivotal movement about the longitudinal axis of the base, the pivotal part having for its part carrying a pivoting connection body with a fluid inlet. At the end a manometer may additionally be secured to the pivotal part. The manometer is connected with a duct in the pivotal part, such duct being permanently connected with a duct in the base independently of the pivotal setting of the pivotal part.

The German patent publication 10,259,395 A1 describes a connection member for fluid lines with a pivotal part mounted on a base for pivoting movement about its longitudinal axis. A duct extending in the pivotal part is constantly connected with a duct in the base irrespectively of the angular setting.

The U.S. Pat. No. 5,713,609 discloses a coupling means serving for producing a fluid connection. It comprises two coupling parts which are connected together in a rotatable manner and respectively comprise a fluid connection. The fluid connections are connected independently of the relative angular position of the coupling parts by way of ducts and an annular groove.

SHORT SUMMARY OF THE INVENTION

One object of the invention is to create aa fluid power device of the type initially mentioned whose pressure regulator may be adapted for different fitting situations of the fluid power device in a simpler and more rapid manner.

In order to achieve these and/or other objects appearing from the present specification, claims and drawings, in the present invention the respective pressure regulator is provided with a manometer holder carrying the manometer, such holder being able to be pivoted in relation to the regulator housing without interruption of the tapping duct about a axis of rotation perpendicular to the longitudinal axis and to the upright axis into various different display positions.

It is in this manner that the orientation of the manometer may be varied without using additional components and without interruption of operation of the device by simple pivoting of the manometer holder carrying the manometer. Once a suitable angle of pivot is ensured the manometer may be selectively, for example, aligned horizontally or vertically in order to render possible reading the manometer from the front or from above. If in the fluid power device several pressure regulators are provided having manometers arranged side by side, whose overall width is smaller than the diameter of the manometer, there is in addition the possibility of positioning adjacent manometers in display positions differing from each other as regards their angle of pivot so that the manometers do not collide although however the alignments only diverge a little and accordingly despite the different angular positions there is the possibility, for instance, of reading all manometers, dependent on their alignment, from the front or from above. In order to exclude collision of adjacent manometers their holders may if required, be made with different lengths so that the distances between a manometer and the axis of rotation in the case of adjacent pressure regulators may differ from each other by a distance which excludes mutual interference during pivoting.

Further advantageous developments of the invention are defined in the claims.

It is an advantage if the manometer holder of the respective pressure regulator is at least able to be positioned in a first and a second principal display position, the display face of the manometer facing in the direction of the upright axis in the first principal display position and in the second principal display position in the direction of the longitudinal axis.

A design is possible such that between the principal display position several intermediate display positions may be set steplessly or in steps. At least when stepless positioning is provided for, it is for example possible to render possible positionability in selectively four display positions angularly differing by 30 degrees from each other. A positionability would also be particularly convenient in three angular settings offset by respectively by 45 degrees from each other, the middle display position preferably lying angularly between the two principal display positions.

The pivoting bearing of the manometer holder is preferably implemented by means of a cylindrical bearing section of the manometer holder which is rotatably mounted in a bearing socket in the regulator housing.

The manometer may be seated in a support arm, extending athwart and more particularly at a right angle to the longitudinal axis from the bearing section, of the manometer holder, the display face more especially facing in the direction of the longitudinal axis of the support arm. The bearing socket may in this case be constituted by two spaced apart bearing eyes in the regulator housing, between which the support arm fits and in which trunnions of the bearing section on either side of the support arm are fitted in a rotatable manner. At least one bearing eye has a peripheral assembly opening, which given a suitable angular position of the manometer holder, permits the passage of the support arm for the purpose of fitting it or removing it. In the fitting or assembly opening a closure member is preferably secured in a detachable manner.

In order to permit a positioning in steps of the manometer holder detent means may be provided, which render possible a locking of the manometer holder in steps in relation to the regulator housing in the respectively necessary display position. For instance the bearing section may have a ring of teeth on its outer periphery for engagement by a resilient detent element, which is fixed on the regulator housing.

The invention is with advantage applicable to all fluid power devices having at least one pressure regulator. It is particularly recommended for the invention to be employed in connection with a valve device having one or more multiway valves in addition to one or more pressure regulators.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES.

FIG. 2 shows part of the device in accordance with FIG. 1 to show the pressure regulators placed on the same side alongside each other of adjacent control units with differently positioned manometers.

FIG. 3 shows the arrangement of FIG. 2 in a front elevation looking in the direction of the arrow III.

Figure 1:
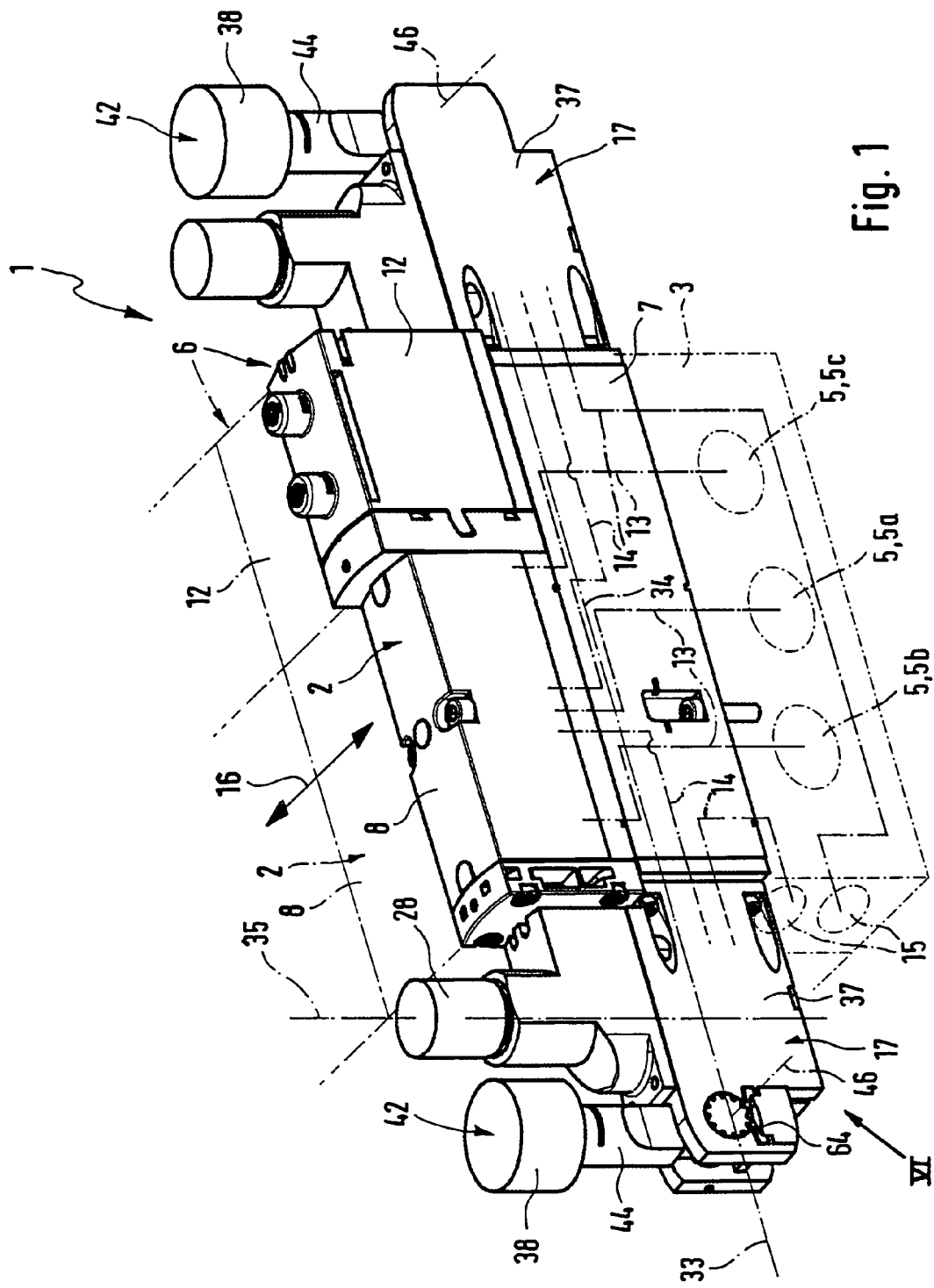
FIG. 1 shows a preferred design of the fluid power device in accordance with the invention in the form of a valve device, only one of several control units, which are arranged alongside each other in a row, being illustrated in order to make the drawing more straightforward, the device comprising inter alia a multiway valve and at least one pressure regulator.
Figure 5:
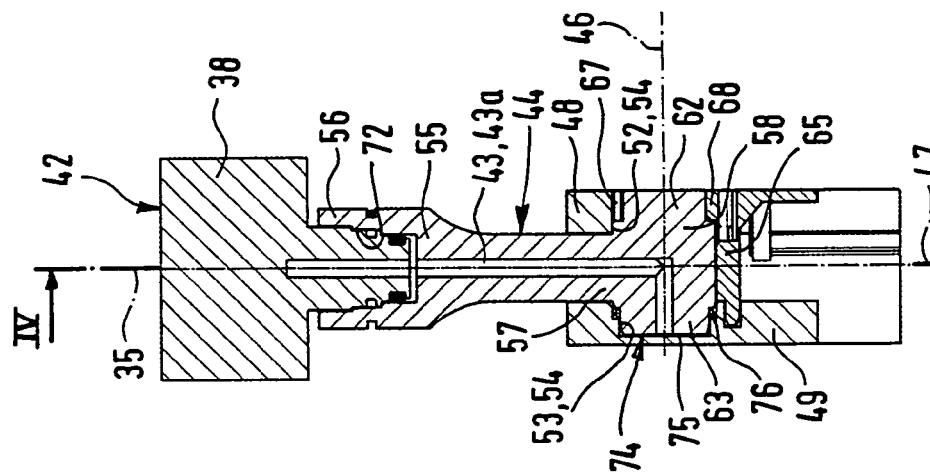
FIG. 5 is a section taken through the arrangement of FIG. 4 in the vicinity of a manometer and of the manometer holder supporting it on the section line V-V in FIG. 4.

DETAILED ACCOUNT OF WORKING EMBODIMENT OF THE INVENTION.

In the case of the fluid power device 1 illustrated in the drawings it is a question of a valve device, in which several multiway valves 2 are collected together. The device 1 is operated using compressed air, although in principle a hydraulic mode of operation comes into question.

The device 1 possesses a single piece or, as in the working example, a modularly designed base plate 3, which in FIG. 1 is indicated in chained lines and through which several central ducts 5 extend in the direction of the longitudinal axis 4 of the base plate. The central ducts 5 are in the working embodiment a supply duct 5a, by way of which the pressure medium to be controlled is fed, and furthermore two venting ducts 5b and 5c by way of which the spent compressed air returning from the loads is removed.

On the base plate 3 there are several mounting areas each of which bear a control unit 6, only one such unit being depicted in FIG. 1. FIG. 2 shows the end sections of four control units 6 placed on the base plate 3.

Each control unit 6 possesses an intermediate plate or board 7 with an elongated configuration seated on the base plate 3, such plate 7 bearing an electrically activated multiway valve 2. The multiway valve 2 possesses a control valve 8 with a conventional valve spool, not illustrated in detail, and an electrical drive part 12, for example in the form of one or more solenoid valves.

Branch ducts 13 extending from the central ducts 5 run through the base plate 3 and the intermediate plate 7 lying thereon and are connected with the control part 8 for transmission of fluid. In a similar fashion each control unit 6 is provided with two power ducts 14, which starting at the control part 8 extend through the intermediate plate 7 and then extend in the base plate 3 to open at connection openings 15 or ports thereof at which a load, for example a drive activated by fluid force, is able to be connected. The various ducts are only indicated diagrammatically in FIG. 1.

Figure 4:
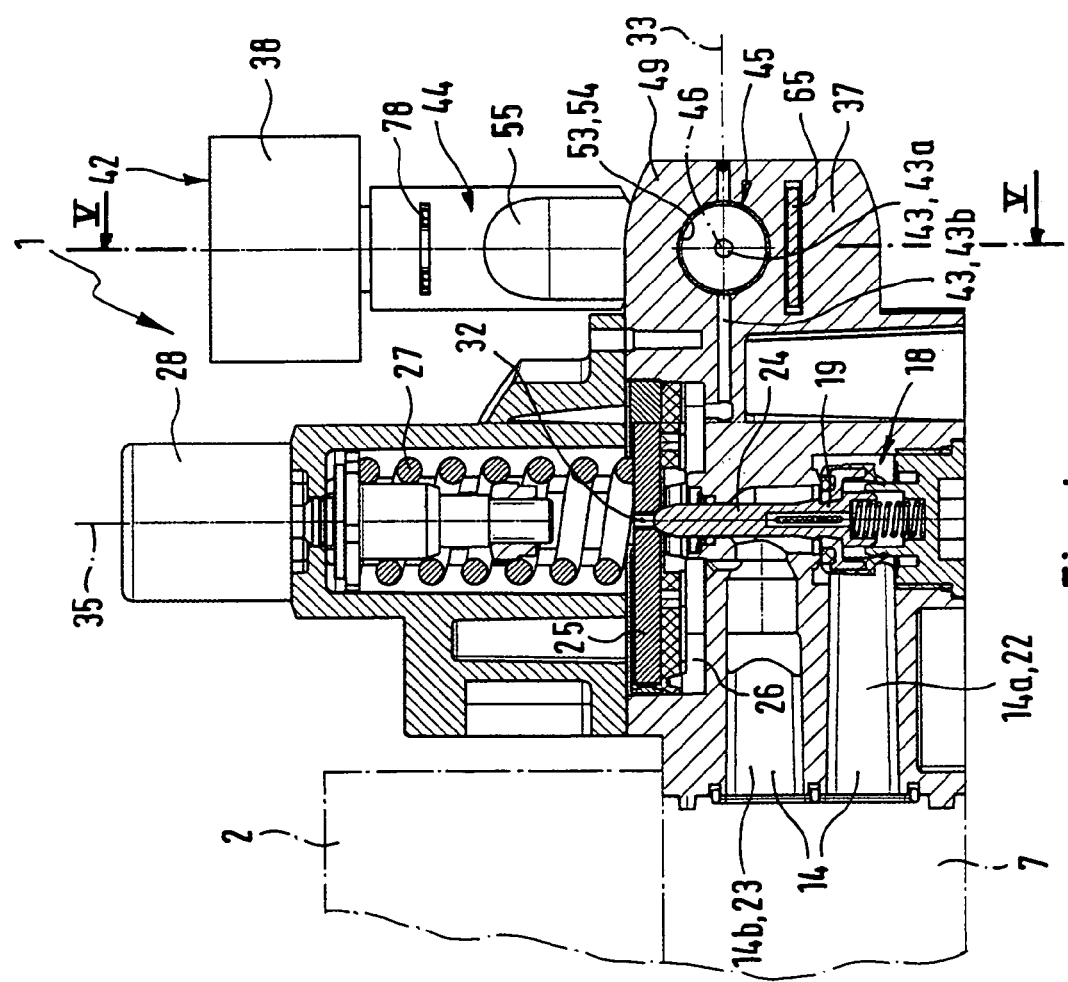
FIG. 4 is a longitudinal section taken through a control unit in the vicinity of the pressure regulator of the section line IV-IV in FIGS. 2 and 5.

The control units 6 and accordingly the multiway valves 2 too and the intermediate plates 7 for same are arranged in a line-up direction indicated by a double arrow 16 alongside each other in sequence. The longitudinal axes of the multiway valves 2 and of the intermediate plates 7 are at a right angle to the line-up direction 16, a pressure regulator 17 being secured on the end sides, aligned in the direction of the associated longitudinal axis, of the intermediate plate 7. Each pressure regulator 17, from the point of view of the circuit, connected on the one of the two power ducts 14, FIG. 4 showing the power duct sections 14a and 14b generally referenced 18 and placed upstream and downstream.

By way of the pressure regulators of a respective control unit 6 it is accordingly possible in the working example for the power pressure available at the two connection openings 15 to be individually set.

Using the pressure regulators 17 furthermore other regulation tasks may be implemented, more especially as regards connection with other ducts extending through the intermediate plate 7. For instance connection with the branch duct 13 coming from the supply duct 5a would be possible in order to individually set the supply pressure for the multiway valve 2 of the respective control unit 6. If only the pressure in a fluid duct extending in the intermediate plate 7 is to be regulated, it is possible to do without one of the two pressure regulators 17 so that merely one end of the intermediate plate 7 is fitted with a pressure regulator 17.

The internal structure of the pressure regulator 17 and the manner of functioning of its pressure regulation means 18 may be in accordance with the prior art relating to pressure regulators and for the present does not require any detailed explanations. Putting it briefly it is important to note that the pressure regulating means 18 comprise an axially moving valve member 19 that is placed on the connection between the a primary duct 22 and a secondary duct 23 and has an actuating plunger 24 cooperating with an actuating piston 25 delimiting a control chamber 26 constantly connected with the secondary duct 23. Accordingly the actuating piston 25 is constantly exposed to the secondary pressure obtaining in the secondary duct 23. In the working embodiment the primary duct 22 and the secondary duct 23 are formed by two sequentially placed branches from a power duct 14. Instead of the actuating piston 25 it is also possible to provide an actuating diaphragm.

A spring means 27 acts on the actuating piston 25 in the opposite direction. By means of a setting knob 28 the setting force of the spring means 27 may be varied and set for customization.

As long as the secondary pressure has not yet reached the desired value, the spring means 27 thrusts the actuating plunger 24 by way of the intermediately placed actuating piston 25 into the open position shifted downward in accordance with FIG. 1 so that pressure medium may now flow from the primary duct 22 into the secondary duct 23 without hindrance. When the pressure has reached the desired level in the secondary duct 23, the secondary pressure accordingly obtaining in the control chamber 26 will shift the actuating piston 25 against the spring means 27 upward so that the actuating plunger 24 is shifted into the closed position and prevents flow of pressure medium from the primary duct 22 into the secondary duct 23 to takes its place.

The pressure regulator 17 in the working example is fitted with so-called secondary venting means. If the pressure in the secondary duct 23 rises above the desired level, the actuating piston 25 will come clear of the actuating plunger 24 no longer keeping up with it so that a venting opening 32 is cleared by way of which the pressure medium may flow from the control chamber 26 into the atmosphere.

The longitudinal axis 33 of the pressure regulator 17 extends in parallelism to the longitudinal axis 34 of the intermediate plate 7 and preferably is aligned perpendicularly to the line-up direction 16. Moreover the upright axis 35 of the pressure regulator 17 is perpendicular to the longitudinal axis 33, such axis 35 being preferably also perpendicular to the line-up direction 16. The line-up direction 16 is aligned in direction with the transverse axis 36 of the pressure regulator 17.

The setting knob 28 is preferably located on the top side of the pressure regulator 17. Its axis of rotation extends in the same direction as the upright axis 35.

At its end side opposite to the intermediate plate 7 in the direction of the longitudinal axis 33 the regulator housing 37 containing the above described pressure regulating means 18 is fitted with a manometer 38. At a display face 42 with for example a scale and an indicating hand or pointer, the manometer indicates the pressure in the secondary duct 23. Such pressure is tapped by way of a tapping duct 43 connecting the manometer 38 with the control chamber 26, or if necessary, also directly with the secondary duct 23.

The manometer 38 is not directly seated on the regulator housing 37 but on a separate manometer holder 44 able to be pivoted in relation to the regulator housing 37. The axis 46 of rotation extends perpendicularly to the longitudinal axis 33 and the upright axis 35 of the regulator housing 37, the manometer 38 preferably being so arranged on the manometer holder 44 that the display face 42 faces perpendicularly away from the axis of rotation 46.

Owing to the rotatable support the manometer holder 44 it may be pivoted in the pivot plane 47 subtended by the longitudinal axis 33 and the upright axis 35 or a plane 47 parallel to it and may be so positioned in different display positions, which are characterized in that the display face 42 may be aligned in different directions.

In order to make clear the possibility of varying the position of the manometer 38 in the case of FIG. 2 the manometer holders 44 of the four pressure regulators shown here are illustrated in different display position with correspondingly different pivot angles in relation to the regulator housing 37. The manometer holder 44 of the pressure regulator 17 depicted in the front part assumes a first principal display position, in which its display face 42 is directed in the direction of the upright axis 35, i. e. it is orientated in the same direction as it is. The manometer holder 44 of the pressure regulator 17 arranged far to the rear is pivoted into a second principal display position, in which the display face is directed along the longitudinal axis 33, that is to say it has the same orientation as it. The two intermediately placed manometer holders 44 respectively assume an intermediate display position lying between the two principal display positions, albeit with different alignments. In the working embodiment in FIG. 2 the four display positions are offset or pivoted by respectively 30 degrees in relation to one another.

It would be possible for example to provide for positionability selectively in three display position. In this case it is then convenient for two display positions to be constituted by the two principal display positions pivoted through 90 degrees in relation to each other, whereas the third display position is at an angle between them with an angular offset of 45 degrees from each principal display position.

It will be clear that the pivotability of the manometer holder 44 offers the possibility of varying the position of the manometer 38 secured to it so that in the respective application it is possible to read the display face 42 along the desired direction of viewing.

Frequently there is a need for an installation of the fluid power device 1 in such a manner either from the front, that is to say in the direction of the longitudinal axis 33, or from above, that is to say in the direction of the upright axis 35, it is possible to read every single one of the manometers 38 of the device 1. If the regulator housings 37 are not narrower than the manometers 38, then the manometer holders 44 of all pressure regulators 17 present may be positioned either in the first or in the second principal display position.

Frequently however the width of the regulator housing 37 will be less than the diameter of the respective manometer 38 so that it is not possible to position adjacent manometer holders 44 with the same pivot angle. In such a case there is however owing to the pivotability present the possibility of placing adjacent manometer holders 44 in display positions slightly differing in angle so that there is only a slight oblique positioning of individual display faces 42 at a small acute angle, which practically does not impair reading the manometers.

Accordingly it is possible, when readability from above is desired, to shift every second manometer holder 44 into the first principal display position, whereas each manometer holder 44 between them assumes an intermediate display position which is slightly pivoted in relation thereto, as in FIGS. 2 and 3 in the case of the first and second manometer holders 44 counting from the front. If on the other hand the possibility of reading from the front is desired a comparable alternating arrangement is possible, in the case of which the manometer holders 44 in the line-up direction 16 alternatingly assume the second principal display position and an intermediate display position, pivoted to be at a small angle thereto. This is then the same as in the arrangement to be seen in FIGS. 2 and 3 in the case of the two rear manometer holders.

The axes 46 of rotation of all pressure regulators 17, which are associated with identically orientated end sides of the intermediate plate 7, preferably coincide. The axes 46 of rotation furthermore preferably extend in parallelism to the line-up direction 16.

In the working embodiment the manometers 38 are secured in the case of all pressure regulators 17 with the same distance from the axis 46 of rotation on the respective manometer holder 44. Owing to the mutual interference resulting from this adjacent manometers 38 can not have an identical alignment. In order to prevent such interference directly adjacent manometers 38 may if necessary be secured on manometer holders 44 of different length so that there are different distances from the axis 46 of rotation which are so selected that the manometer holders 44 may be pivoted past each other without any danger of collision of the manometers 38 supported on them. Such a design is indicated in FIG. 3, where one manometer 38a is illustrated, which in connection with an extended manometer holder 44 may be pivoted clear of the directly adjacent manometer 38 without collision.

In the following a preferred type of configuration and rotary support means for the manometer holder 44 will be outlined in more detail.

At the pivot point 45 the regulator housing 37 has two bearing eyes 48 and 49 spaced from one another in the direction of the transverse axis 36, which have two coaxially flush cylindrically circular recesses, same together constituting a bearing socket 54. While the one, first recess 52 extends through the associated first bearing eye 48, the other, second recess 53 is in the form of a blind hole in the associated second bearing eye 49, its open side facing the first bearing eye 48. The longitudinal axis of the bearing socket 54 coincides with the axis 46 of rotation.

The manometer holder 44 has a first support arm 55 aligned to be perpendicular to the axis 46 of rotation and carrying the manometer 48 at its outer end section 56.

By means of its inner end section 57 the support arm 55 is secured on an essentially cylindrical bearing section 58, it being made more particularly integral with this bearing section 58 and extending perpendicularly away from the longitudinal axis of the bearing section 58.

On opposite sides the bearing section 58 possesses mutually coaxial cylindrical first and second trunnions 63 projecting laterally from the support arm 55, which fit in the first and, respectively, second recess 52 and 53 from the inside, the support arm 55 preferably being aligned perpendicularly.

In order to render possible fitting and dismounting the first bearing eye 48 is peripherally provided with an assembly opening 64, whose width as measured in the peripheral direction of the first recess 52 is at least equal to the diameter of the support arm 55 at the inner end section 57. In the working embodiment the assembly opening 64 is located on the bottom side of the first bearing eye 48.

For assembly the downwardly extending support arm 55 of the manometer holder 44 is inserted from the side so that its bearing section 58 extends through the first recess 52, the support arm 55 extending across the assembly opening 64. If now the manometer holder 44 is pivoted upward, the axial position will be automatically secured, because the support arm 55 is held between the two bearing eyes 48 and 49.

In the working embodiment with the manometer holder 44 installed a releasable closure member 65 is inserted in the assembly opening 64, such member 65 being held in position more particularly by a detent action. It has an abutment section 66 extending into the intermediate space between the two bearing eyes 48 and 49 and is accordingly located in the path of pivoting motion of the support arm 55 so that it limits its angle of pivoting. For instance this may define the second principal display position. The first principal display position may more particularly be set by the support arm 55 running onto that part of the regulator housing 37, which bears the two bearing eyes 48 and 49.

In the working embodiment the individual display positions of the manometer holder 44 are able to be set in steps using detent means. Accordingly even in the case of relatively violent vibrations it is possible to ensure reliable holding of the respectively set display position.

In the working embodiment the detent means comprise a ring 67 of teeth of the first trunnion 62 preferably extending right around the periphery and having radially outwardly projecting teeth. On the associated first bearing eye 48 in the peripheral part of the ring 67 of teeth there is a detent element 68 which is radially elastic relative thereto, for example in the form of a opposite teeth in a ring with a smaller periphery than the ring 67 of teeth.

In the working embodiment the detent element 68 is a component of the closure member 65 so that no separate component is necessary and by the use of a multi-functional component economy in costs of manufacture is possible.

The ring 67 of teeth is preferably axially sunk into the first recess 52 so that it does not unnecessarily increase the overall width of the regulator housing 37.

The above mentioned tapping duct 43 is in the working example composed of an outer and an inner duct section 43a and 43b. The outer duct section 43a opens at one end at an interface 72 provided at the outer end section 56 of the support arm 55, on which the manometer, preferably using a plug connection which is releaseably locked, is secured with a sealing effect on the manometer holder 44. By way of the interface 72 there is communication between the outer duct section 43a and the manometer or tapping duct 73 extending in the manometer 38.

The outer duct section 43a extends in the interior of the support arm 55 as far as the bearing section 58, where changes its direction by a right angle in order to extend through the second trunnion 63, more particularly coaxially, and to open at its end face 74 to which the floor 75 of the blind recess 53 of the second bearing eye 49 is opposite with a minimum clearance therebetween.

Peripherally one end of the inner duct section 43b, running in the regulator housing 37, of the tapping duct 43 opens while the other end communicates with the control chamber 26.

A sealing ring 76 surrounding the trunnion 63 seals off that portion of the second recess 53 from the surroundings, into which the two duct sections 43a and 43b open. Accordingly the two duct sections 43a and 43b are connected together fluidwise independently of the current display position of the manometer holder 44. This connection furthermore remains in existence during the pivotal movement as well so that the alignment of the manometer 38 may be changed even during operation of the pressure regulator 17 without interfering with operation.

Figure 7:
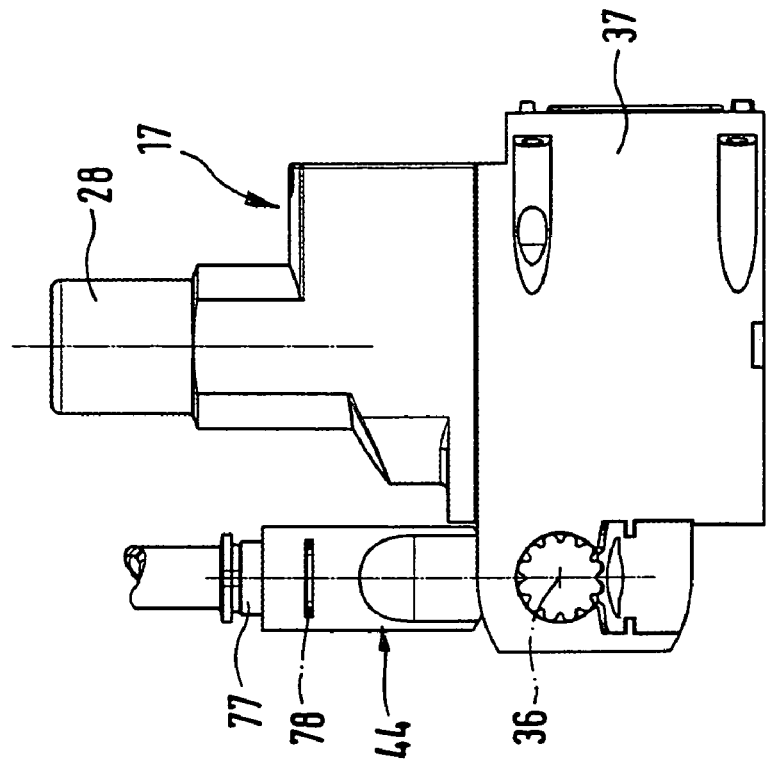
FIG. 7 shows a pressure regulator modified for telemetric interrogation as a separate view.
Figure 6:
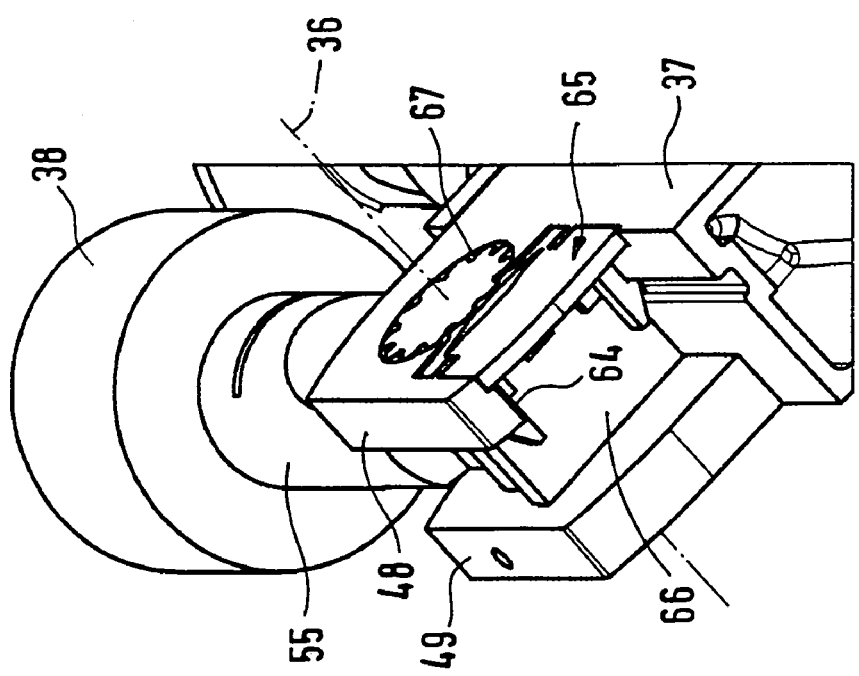
FIG. 6 is a view on a larger scale of the end portion of a pressure regulator looking in the direction of the arrow VI from below.

FIG. 7 serves to illustrate that at least one pressure regulator 17 may be redesigned if required for telemetric indication of the secondary pressure. In this case in lieu of the manometer a hose connection member 77 is mounted on the manometer holder 44 with which a pressure medium hose may be connected in a releasable manner and which extends to the position, at which pressure indication is desired. Here it can be connected with the manometer installed at a distance from the pressure regulator 17. The hose connection member 77 is so designed that it matches the interface 72 of the support arm 55 and may be plugged into same with a sealing effect. The locking of the plug connection may be performed by means of a latch element 78 having for example the form of a U-shaped bail in the same manner as is the case with the plugged-in manometer 38.

If required it is possible to do without detent means for securing the different display positions of the manometer holder 44. It would for example be possible to make the pivoting of the manometer holder 44 stiffer to move in relation to the regulator housing 37 so that holding in each pivot position by friction would be stepless. If the sealing ring 76 is installed with sufficient bias it may suffice to provide the frictional force necessary for positioning.

The invention claimed is:

1. A fluid power device fitted with at least one pressure regulator having a longitudinal axis and an upright axis perpendicular thereto, the housing of said pressure regulator being fitted with a manometer at an end thereof, said manometer indicating a secondary pressure tapped from the regulator housing via a tapping duct and being able to be positioned with different alignments in relation to the regulator housing in order to ensure readability of its display face at different directions of viewing, comprising a holder bearing the manometer which without interruption of the tapping duct may be pivoted in relation to the regulator housing about an axis of rotation perpendicular to the longitudinal axis and to the upright axis of the regulator housing into different display positions, wherein said holder extends outwardly from said housing in a direction perpendicular to said axis of rotation.

2. The device as set forth in claim 1, wherein the manometer holder is able to be selectively positioned at least in a first and in a second principal display position, the display face of the manometer facing in the first display position in the direction of the upright and in the second display position in the direction of the longitudinal axis.

3. The device as set forth in claim 2, wherein the manometer holder is able to be alternatively positioned in at least one intermediate display position between the two principal display positions.

4. The device as set forth in claim 1, wherein the manometer holder is able to be selectively positioned in three or four display positions offset by 45 degrees or 30 degrees.

5. The device as set forth in claim 1, wherein the manometer is secured to the manometer holder with the use of a releaseably locked plug connection.

6. The device as set forth in claim 1, comprising several pressure regulators arranged in a line-up direction side by side, the line-up direction extending in parallelism to the axes of rotation of the manometer holder.

7. The device as set forth in claim 6, wherein in the case the manometer holders of directly adjacent pressure regulators may assume mutually different display positions without mutual interference.

8. The device as set forth in claim 7, wherein manometer holders, which are adjacent in the line-up direction, are arranged so that the display faces of their manometers alternatingly face in the direction of the longitudinal axis and in a direction at an acute angle thereto.

9. The device as set forth in claim 7, wherein manometer holders adjacent to each other in the line-up direction are arranged so that the display faces of their manometers alternatingly face in the direction of the upright axis and a direction at an acute angle thereto.

10. A fluid power device fitted with at least one pressure regulator having a longitudinal axis and an upright axis perpendicular thereto, the housing of said pressure regulator being fitted with a manometer at an end thereof, said manometer indicating a secondary pressure tapped from the regulator housing via a tapping duct and being able to be positioned with different alignments in relation to the regulator housing in order to ensure readability of its display face at different directions of viewing, comprising a holder bearing the manometer which without interruption of the tapping duct may be pivoted in relation to the regulator housing about an axis of rotation perpendicular to the longitudinal axis and to the upright axis of the regulator housing into different display positions, wherein the manometer holder is rotatably mounted with the aid of a cylindrical bearing section in a bearing socket of the regulator housing.

11. The device as set forth in claim 10, wherein the manometer is seated on a support arm, extending athwart the axis of rotation from the bearing section, of the manometer holder, the bearing socket being constituted by two spaced apart bearing eyes, and into such eyes trunnions, placed on either side of the support arm, of the bearing section extend, one bearing eye peripherally having an assembly hole rendering possible entry of the support arm, said assembly hole preferably having a releaseably secured closure member in it.

12. The device as set forth in claim 11, wherein the closure member has an abutment section delimiting the angle of pivot of the manometer holder, said abutment section extending between the two bearing eyes and into the path of pivoting of the support arm.

13. The device as set forth in claim 10, wherein the tapping duct has an outer duct section extending in the interior of the manometer holder between the attachment position of the manometer and the bearing section and opens at the bearing section into a section of the bearing socket, said section being connected with an inner duct section, leading to the pressure regulating means, and being sealed off from the surroundings.

14. A fluid power device fitted with at least one pressure regulator having a longitudinal axis and an upright axis perpendicular thereto, the housing of said pressure regulator being fitted with a manometer at an end thereof, said manometer indicating a secondary pressure tapped from the regulator housing via a tapping duct and being able to be positioned with different alignments in relation to the regulator housing in order to ensure readability of its display face at different directions of viewing, comprising a holder bearing the manometer which without interruption of the tapping duct may be pivoted in relation to the regulator housing about an axis of rotation perpendicular to the longitudinal axis and to the upright axis of the regulator housing into different display positions, the device further comprising detent means for securing the manometer holder with a detent functionality in relation to the regulator housing in the respective display position.

15. The device as set forth in claim 14, wherein the manometer holder is rotatably mounted with the aid of a cylindrical bearing section in a bearing socket of the regulator housing comprising detent, said bearing section having a ring of teeth on an outer periphery thereof for engagement by a resilient detent element secured to the regulator housing.

16. The device as set forth in claim 15, wherein the ring of teeth is arranged on the trunnion provided for the closure member, the detent element being provided on the closure member.

17. A fluid power device fitted with at least one pressure regulator having a longitudinal axis and an upright axis perpendicular thereto, the housing of said pressure regulator being fitted with a manometer at an end thereof, said manometer indicating a secondary pressure tapped from the regulator housing via a tapping duct and being able to be positioned with different alignments in relation to the regulator housing in order to ensure readability of its display face at different directions of viewing, comprising a holder bearing the manometer which without interruption of the tapping duct may be pivoted in relation to the regulator housing about an axis of rotation perpendicular to the longitudinal axis and to the upright axis of the regulator housing into different display positions, wherein the device comprises several pressure regulators arranged in a line-up direction side by side, the line-up direction extending in parallelism to the axes of rotation of the manometer holder, the device being in combination with an integral or modularly designed base plate fitted with several multiway valves placed in sequence in the line-up direction, an intermediate plate, having fluid ducts therein, being placed between at least one multiway valve and the base plate and on at least one end side on such intermediate plate a pressure regulator is arranged.

18. A fluid power device fitted with at least one pressure regulator having a longitudinal axis and an upright axis perpendicular thereto, the housing of said pressure regulator being fitted with a manometer at an end thereof, said manometer indicating a secondary pressure tapped from the regulator housing via a tapping duct and being able to be positioned with different alignments in relation to the regulator housing in order to ensure readability of its display face at different directions of viewing, comprising a holder bearing the manometer which without interruption of the tapping duct may be pivoted in relation to the regulator housing about an axis of rotation perpendicular to the longitudinal axis and to the upright axis of the regulator housing into different display positions, wherein the device comprises several pressure regulators arranged in a line-up direction side by side, the line-up direction extending in parallelism to the axes of rotation of the manometer holder, and, wherein in the case of adjacent pressure regulators the manometer holders are of different length and the manometers are arranged thereon at different distances from the axis of rotation so that the manometer holders are able to be pivoted past each other without manometers borne by them colliding.

* * * * *